(12) United States Patent
Le Rouzic et al.

(10) Patent No.: US 11,418,635 B2
(45) Date of Patent: Aug. 16, 2022

(54) METHOD OF DYNAMIC SELECTION, BY A CALLER, FROM A PLURALITY OF TERMINALS OF A CALLEE

(71) Applicant: Orange, Paris (FR)

(72) Inventors: Jean-Claude Le Rouzic, Trebeurden (FR); José Doree, Lannion (FR)

(73) Assignee: Orange, Paris (FR)

(*) Notice: Subject to any disclaimer, the term of this patent is extended or adjusted under 35 U.S.C. 154(b) by 128 days.

(21) Appl. No.: 15/321,181

(22) PCT Filed: Jun. 11, 2015

(86) PCT No.: PCT/FR2015/051545
§ 371 (c)(1),
(2) Date: Dec. 21, 2016

(87) PCT Pub. No.: WO2015/197937
PCT Pub. Date: Dec. 30, 2015

(65) Prior Publication Data
US 2017/0201605 A1    Jul. 13, 2017

(30) Foreign Application Priority Data
Jun. 23, 2014 (FR) ...................................... 1455820

(51) Int. Cl.
*G06F 15/173* (2006.01)
*H04L 69/24* (2022.01)
(Continued)

(52) U.S. Cl.
CPC .......... *H04L 69/24* (2013.01); *H04L 65/1006* (2013.01); *H04L 65/1016* (2013.01); *H04L 65/1069* (2013.01)

(58) Field of Classification Search
CPC . H04L 69/24; H04L 65/1016; H04L 65/1006; H04L 65/1069
See application file for complete search history.

(56) References Cited

U.S. PATENT DOCUMENTS

2006/0218291 A1* 9/2006 Zhu ..................... H04L 65/1069
709/229
2009/0083426 A1* 3/2009 Cagenius .............. H04L 29/125
709/227
(Continued)

OTHER PUBLICATIONS

Poikselkä et al. Jan. 1, 2009. *IMS: IP Multimedia Concepts and Services*, 3rd Ed. In: *IMS IP Multimedia Concepts and Services* (pp. 57-58). Chichester, GB: John Wiley & Sons.
(Continued)

*Primary Examiner* — Anh Nguyen
(74) *Attorney, Agent, or Firm* — Knobbe Martens Olson & Bear, LLP (57) ABSTRACT

Some embodiments relate to a selection method enabling a first user of an IP network to select one client device from a plurality of client devices of a second user connected to the IP network. The method comprises the client device of the first user sending a request to the second user the request being of a dedicated type or having a header containing a dedicated indicator. At least one of the client devices of the second user that has received the request responds to the first user message via a request indicating the technical capabilities of the client device of the second user and requests the client device of the first user to supply the technical capabilities of that client device of the first user. The method may have applications to IMS networks.

10 Claims, 1 Drawing Sheet

(51) Int. Cl.
*H04L 65/1016* (2022.01)
*H04L 65/10* (2022.01)
*H04L 65/1069* (2022.01)

(56) References Cited

U.S. PATENT DOCUMENTS

| | | | | |
|---|---|---|---|---|
| 2010/0070632 | A1* | 3/2010 | Song | H04W 76/16 |
| | | | | 709/227 |
| 2011/0010768 | A1* | 1/2011 | Barriga | H04L 63/0428 |
| | | | | 726/11 |
| 2011/0019650 | A1 | 1/2011 | Van Niekerk | |
| 2011/0314140 | A1 | 12/2011 | Stille et al. | |
| 2013/0070737 | A1* | 3/2013 | Ku | H04W 8/26 |
| | | | | 370/338 |
| 2014/0071889 | A1* | 3/2014 | Aksu | H04L 29/06278 |
| | | | | 370/328 |

OTHER PUBLICATIONS

Poikselkä et al. Mar. 17, 2009. Media Negotiation. In: *IMS IP Multimedia Concepts and Services* (pp. 362-373). Chichester, GB: John Wiley & Sons.
Rosenberg et al. Jun. 1, 2002. RFC 3261. SIP: Session Initiation Protocol, 222 pages.
International Search Report dated Sep. 16, 2015 for International Application No. PCT/FR2015/051545 filed Jun. 11, 2015, 8 pages.
Written Opinion dated Sep. 16, 2015 for International Application No. PCT/FR2015/051545 filed Jun. 11, 2015, 9 pages.
International Preliminary Report on Patentability for Application No. PCT/FR2015/051545, filed Jun. 11, 2015.

* cited by examiner

METHOD OF DYNAMIC SELECTION, BY A CALLER, FROM A PLURALITY OF TERMINALS OF A CALLEE

RELATED APPLICATIONS

This application is the U.S. National Phase of Application No. PCT/FR2015/051545 entitled "METHOD OF DYNAMIC SELECTION, BY A CALLER, FROM A PLURALITY OF TERMINALS OF A CALLEE" filed Jun. 11, 2015, which designated the United States, and which claims the benefit of French Application No. 1455820 filed Jun. 23, 2014.

TECHNICAL FIELD

The present invention relates to Internet protocol (IP) type communications networks, and in particular to those IP networks that are suitable for implementing advanced session control protocols. IP networks enable conversation data to be conveyed in the context of services such as "voice-over-IP" (VoIP), "content sharing", or "instant messaging".

BACKGROUND

More particularly, the present invention relates to the means installed in an IP network to enable the sender of a request to obtain the technical capabilities of the client devices that are connected to said IP network at the destination of the request so as to be able to select from among those client devices the device that appears to be the most suitable for satisfying the request.

By way of example, such "client devices" may be a fixed or mobile terminal, or a residential or business gateway. In the interest of brevity, these various kinds of user equipment (UE) are frequently referred to below by the generic term "user terminal", or just "terminal".

IP network communication services can identify physical or virtual resources by means of character strings such as a uniform resource identifier (URI). The syntax of URIs is defined in the Internet engineering task force (IETF) document RFC 3986; knowing the URI of a resource makes it possible to obtain the IP address of network equipment of the operator managing the resource. In the present description, the term "URI" is used for any type of identifier of a physical or virtual application resource that is accessible on a network.

Conventional advanced session control protocols, such as the session initiation protocol (SIP), make use of so-called "signaling" messages, which are messages enabling a terminal to request a connection with another terminal, or indeed messages signaling that a telephone line is busy, or signaling that the called telephone is ringing, or indeed signaling that such and such a telephone is connected to the network and may be reached in such and such a manner.

The SIP protocol is defined by the IETF in document RFC 3261. That protocol enables multimedia sessions to be set up, modified, and terminated in a network that uses the IP protocol. Since then, the SIP protocol has been extended, in particular in document RFC 3265. This extension defines procedures for notifying events.

The SIP protocol is used in particular in IP multimedia subsystem (IMS) type infrastructures. IMS is defined by the third generation partnership project (3GPP) standards organization and by telecommunications and Internet converged services and protocols for advanced networking (TISPAN). It is a network architecture that was introduced by 3GPP for mobile networks and then taken on by TISPAN for fixed networks. This architecture enables multimedia sessions to be set up dynamically and controlled between two clients, and it also enables resources to be reserved in the network transporting multimedia streams. This architecture makes it convenient for network operators to implement a management policy, to deliver a predetermined quality of service, and to calculate how much to bill clients. At present, IMS gives access to services of telephone, videophone, presence, and instant messaging types, and it also manages interactions between them.

Each user of an IMS network can be identified therein by means of a variety of identities, and in particular an IP multimedia private identity (IMPI) and an IP multimedia public identity (IMPU).

IMPIs are defined in 3GPP specification TS 23.228. An IMPI is an identity allocated in permanent manner by the operator of a network to a subscription with that operator, and it is used, by way of example, for registering, authorizing access, administering services made available to the user, and billing (it should be observed that a user may have several IMPIs within a single subscription; it is thus possible to associate each IMPI with a different client device). An IMPI is in the form of a network address identifier (NAI) as defined in IETF document RFC 4282.

A user uses an IMPU to communicate with other users. An IMPU is in the form of a URI or a short number, or indeed any alias. For a given IMPI, there may be a plurality of IMPUs (often a tel-URI and a SIP-URI). An IMPU may be shared with another telephone so that both telephones can be reached with the same identity (for example a single telephone number for a family of users). These identities are configured by the operator when a user creates an account with that operator, and use is made of them when registering a user's client device with the network.

Thus, when a user seeks to benefit from services made available by an IMS network, the user sends signaling messages to the network, which messages may include in particular various types of request.

Ignoring exceptions (such as certain emergency calls), the user's client device must begin by registering with the network. When the network is incapable of establishing a link between the registration and an earlier registration (e.g. after a network failure, or after the client device has been switched off for longer than a predetermined duration value), the registration is considered as being an initial registration. After an initial registration, the user's client device must periodically send requests to the network in order to confirm that it seeks to maintain its registration.

In order to be able to register client devices, IMS networks have one or more registration servers known as serving-call server control function (S-CSCF) servers that are suitable (among other functions) for managing the procedure of registering devices connected to the network.

IMS networks also have one or more interrogation servers known as interrogating-call server control function (I-CSCF) servers—which are indeed often physically combined with S-CSCF registration servers so as to constitute "I/S-CSCF" call servers—that, when registering a client device, interrogate a subscriber data server known as a home subscriber server (HSS) in order to be able to select an S-CSCF server that possesses the characteristics that are necessarily required (and where appropriate characteristics that are optionally required) in order to achieve the level of service to which the user has subscribed. Each HSS server contains a client database and is thus the equivalent in IP networks of home location register (HLR) servers as used in global system for mobile communication (GSM) networks. Each HSS server contains the "profile" of some number of client devices of the network, which profile comprises for each of them its registration state, authentication and location data, and subscribed services.

In the process of creating a user account on an IMS network, the network operator begins by creating an IMS subscription in the HSS that will serve as the basis for billing. Thereafter, with reference to the subscription, the operator notes the private and public identities IMPI and IMPU of the users sharing the subscription, and declares the associated service profiles and initial filter criteria (IFCs), together with much other information relating to the users.

IMS networks also have one or more servers known as proxy-call server control function (P-CSCF) servers. For each client device connected to an IMS network, there exists a P-CSCF server acting as a connection entity between the IMS core network and the access network used by the client device; thus, all SIP signaling exchanged between the client device and either the I-CSCF interrogation server or the S-CSCF registration server passes via the P-CSCF server.

When a first user (referred to as the "caller") sends a request to a second user (referred to as the "called party"), the caller (generally) does not know the capabilities of the called party's terminal, or the capabilities of the called party's terminals when there are several of them (typically, each associated with a respective IMPI but with a single common IMPU). The term "capabilities" of a terminal is used in the context of the present invention to refer to the technical capability of that terminal to participate in providing a particular service, e.g. telephone service or high definition voice service (HD), or video service, or indeed instant messaging service. However, it would be very useful for the caller to have knowledge of these technical capabilities, since that would enable the user to know:

1) whether one of the called party's terminals has capabilities that are sufficient for the service desired by the caller; and 2) if such a terminal exists, the identity of that terminal or how to reach it.

Various proposals are known in the state of the art seeking to solve this problem.

In particular, network solutions are known that are based on "application servers" aggregating the capabilities of each of a user's connected terminals. However those solutions do not represent the capabilities of each of the terminals that are actually connected at a given instant, since it is the aggregate of the capabilities of all of the terminals that is made available, and not the individual capabilities of each of the terminals.

Other solutions, based on "forking" (i.e. transmitting a control signal to a plurality of destination terminals), makes it possible to explore the capabilities of at least some of the connected terminals, by sending them respective dedicated requests.

For example, application US 2011/314140 proposes a method of processing a SIP OPTIONS capability request message in an IMS network. A SIP proxy receives a SIP OPTIONS message from a requesting node, which message is for a user of the network, referred to as the called party (it should be recalled that according to the above-mentioned document RFC 3261, a SIP OPTIONS request enables a SIP agent to ask another SIP agent or a SIP proxy to supply it with its own capabilities). The proxy sends the message to a plurality of devices of said called party, and receives a response (SIP 200 OK) from at least two of those devices. Each received response, which includes an identity of the responding device and an indication of the capabilities of the responding device, is stored in a memory. Thereafter, the proxy prepares a response message containing the identities and the capabilities of all of the responding devices. Finally, the response message is sent to the requesting node (specifically, in compliance with Sections 11.2 and 16.7 of document RFC 3261, the proxy can send only one response to the requesting node).

That method according to application US 2011/314140 has the drawback that the procedure of temporarily aggregating and storing responses requires the proxy to have specific means for that purpose, and also imposes a considerable delay on the requesting node before it receives the requested capabilities.

In summary, none of the known solutions enables a caller to select efficiently the terminal that is the most suitable for correctly rendering a service requested by the caller.

SUMMARY

The present invention thus provides a selection method enabling a first user of an IP network to select one client device from a plurality of client devices of a second user connected to said IP network. Said method comprises the following steps:

a) the client device of said first user sending a request to said second user, said request being of a dedicated type (REVOPTIONS) or having a header containing a dedicated indicator; and b) at least one of the client devices of the second user that has received said request responding to the first user message by means of a request indicating the technical capabilities of the client device of the second user and requesting said client device of the first user to supply the technical capabilities of that client device of the first user.

Thus, in the invention, each request sent by a client device of the second user reaches the first user independently of the other requests.

By means of these provisions, a first user (e.g. when setting up a session) can quickly obtain the capabilities of the terminals belonging to any given second user and connected to the IP network.

According to particular characteristics, said method further comprises the following steps:

c) after receiving said requests sent by client devices of the second user, the client device of the first user selecting one of those client devices of the second user on the basis at least of technical capability information contained in those requests;

d) the client device of the first user sending to the selected client device a favorable response to the request sent during said step b) by the selected client device; and e) the client device of the first user and the selected client device entering into a session.

By means of these provisions, on the basis of the received capability information, the first user can select the terminal of the second user that is most appropriate for rendering a service desired by the first user.

According to even more particular characteristics: the request sent by each respective client device of the second user during said step b) includes a respective identifier of that client device; and the client device of the first user inserts the identifier of said selected client device in the response sent during said step d) to the selected client device.

By means of these provisions, the first user can know the technical capabilities of all of the client devices of the second user presently connected to the IP network, even before (optionally) attempting to set up a session with the second user. For example, if none of the client devices of the second user is acceptable for the first user, the first user may decide not to attempt setting up a session with the second user.

According to other even more particular characteristics: said request sent by the client device of the first user during said step a) mentions a service that the first user seeks to obtain during the session that is being set up; and during said step d), the client device of the first user sends an unfavorable response to the requests sent during said step b) by the client devices of the second user that are not selected.

By means of these provisions, and using the indicator of the invention, the first user can quickly obtain the information needed to be able to select from among the client devices of the second user presently connected to the IP network the best client device with which to set up a session. This implementation is well adapted to the situation in which the first user knows that the second user possesses a plurality of client devices presently connected to the IP network.

According to further other even more particular characteristics: prior to said step a), the client device of the first user sends to said second user a request mentioning a service that the first user seeks to obtain during the session that is being set up; and during said step d), the client device of the first user sends an unfavorable response to the requests sent during said step b) by the client devices of the second user that are not selected.

By means of these provisions, a first request enables the first user to obtain a list of client devices belonging to the second user and suitable for supplying the desired service, and then a second request enables the first user, by means of the indicator of the invention or by means of a request of a type dedicated to the invention, to obtain the information necessary to be able to select from said list the best client device with which to set up a session. This implementation is well adapted to the situation in which the first user is not certain in advance whether or not the second user possesses a plurality of client devices presently connected to the IP network.

According to further other even more particular characteristics, if none of the client devices of the second user which have sent during said step b) a request indicating its technical capabilities is technically suitable for providing a service desired by the first user, then, during said step c), the client device of the first user selects from among the client devices of the second user the client device that is the most suitable for supplying a service of reduced quality to the first user.

By means of these provisions, the first use can set up a session with the second user under the best conditions that are possible in practice, given the initially desired service.

Correspondingly, the invention also provides various devices.

Thus, the invention firstly provides a client device of a user of an IP network, referred to as the "first" user, the client device possessing means for sending a request to another user of said IP network, referred to as the "second" user, said request being of a dedicated type or including a header containing a dedicated indicator; and receiving in response from at least one client device of the second user that has received said request, a request indicating the technical capabilities of that client device of the second user and requesting said client device of said first user to supply technical capabilities of the client device of the first user.

According to particular characteristics, said client device further possesses means for selecting one of the client devices of the second user on the basis at least of the technical capability information contained in said requests received from the client devices of the second user.

Secondly, the invention also provides a client device of a user of an IP network, referred to as the "second" user, the client device possessing means for receiving a request sent by a client device of another user of said IP network, referred to as the "first" user, and including a header containing an indicator requesting said client device of the second user to supply its technical capabilities; and sending in response a request indicating its own technical capabilities and requesting said client device of the first user to supply the technical capabilities of the client device of the first user.

The advantages made available by these devices are essentially the same as those made available by the corresponding methods as set out briefly above.

It should be observed that it is possible to make these devices in the context of software instructions and/or in the context of electronic circuits.

The invention also provides a computer program downloadable from a communications network and/or stored on a computer-readable medium and/or executable by a microprocessor. The computer program is remarkable in that it includes instructions for executing steps of the selection method as set out briefly above, when it is executed by a computer.

The advantages made available by the computer program are essentially the same as those made available by said method.

BRIEF DESCRIPTION OF THE FIGURES

Other aspects and advantages of the invention appear on reading the following detailed description of particular implementations given as non-limiting examples. The description refers to the accompanying figures, in which.

DETAILED DESCRIPTION

Although the present invention relates to IP networks in general, consideration is given below by way of implementation example to a network architecture of IMS type, as described briefly above. This architecture is shown in FIG. 1.

The multimedia services made available by the IMS network 1 may comprise the following services: telephone, videotelephone, content sharing, presence, instant messaging, or television. These services are available to the user of a client device (also known as "user equipment", or UE) 10 forming part of the network 1 that enables the client device 10 to exchange multimedia streams and session control signals in compliance with the SIP protocol, e.g. with the client device (not shown) of a user forming part of a SIP network (not shown) connected to the network 1.

The client device 10 may be a fixed or mobile terminal, or a residential or business gateway, having SIP signaling means and potentially having means for playing back an audiovisual content.

Figure 1:
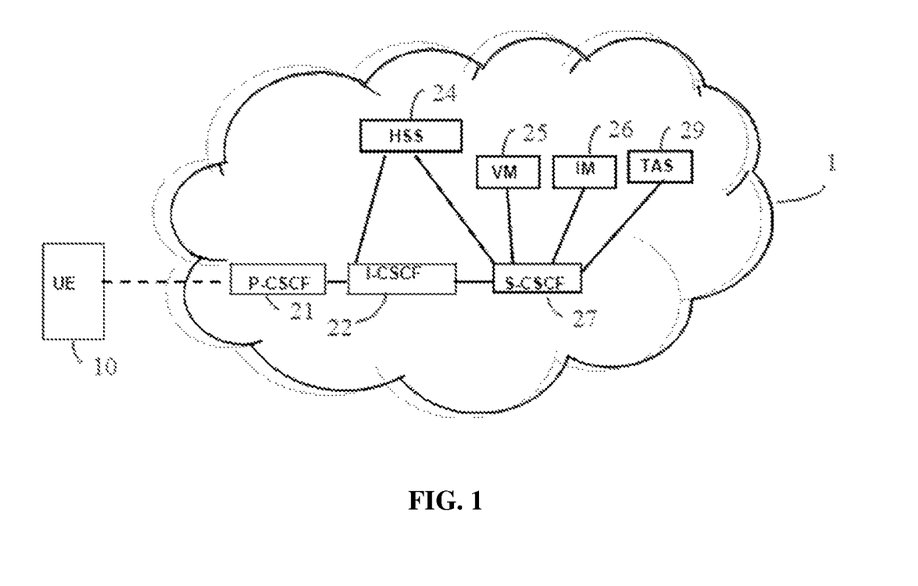
FIG. 1 is a diagram of a system for supplying multimedia services and suitable for implementing the invention.

As shown in FIG. 1, the IMS network 1 comprises, in addition to IP transport infrastructure (not shown):

at least one S CSCF server; the S CSCF server 27 serves in particular to manage the procedure of registering devices connected to the network 1; the S CSCF server 27 also manages the routing of signaling between the client device 10 and the voice messaging (VM) server 25, the instant messaging (IM) server 26, and telephony applications server (TAS) 29;

at least one I CSCF server; the I CSCF server 22 serves in particular to manage routing to other terminals managed by the same IMS network 1 and routing signaling between this IMS network 1 and other networks (not shown);

at least one P CSCF server; the P CSCF server 21 acts as a connection entity between the IMS call network and the access network used by the client device 10;

at least one database server of the HSS type; the HSS server 24 contains the profile of the user of the client device 10 in terms of authentication and location data, and subscribed services;

at least one voice messaging (VM) server 25 (also referred to as a "message-summary" server); the VM server 25 manages the subscription of the client device 10 to events relating to leaving and consulting messages for the client device 10, and it notifies the client device 10 when such events occur;

at least one instant messaging (IM) server 26; if the user of the UE 10 has subscribed to the instant messaging service, then the user can dialog "instantly" on line with other subscribers to that service; and at least one telephone application server (TAS) 29; the TAS server manages the telephone services to which the user of the terminal 10 has subscribed with the operator, such as caller number display or call forwarding.

The voice messaging (VM) server 25, the instant messaging (IM) server 26, and the telephony application server (TAS) 29 are all examples of application servers (AS).

Certain services, such as those of the VM server 25 and of the instant messaging (IM) server 26 are based on the terminal 10 having a subscription to predetermined events, as explained above.

Several implementations of the invention are described below with reference to FIG. 2, in which it is assumed that a user A of an IMS network seeks, by way of example, to place an audio and video call to another user B of the same IMS network.

In a first implementation, the following steps are performed.

During a step E1, the terminal of the first user A sends an OPTIONS type SIP request to the second user B. This request comprises a header containing an indicator of the invention (referred to herein as a "reversecap"); by way of example, this indicator may be inserted in a "Require" header of the request.

Figure 2:
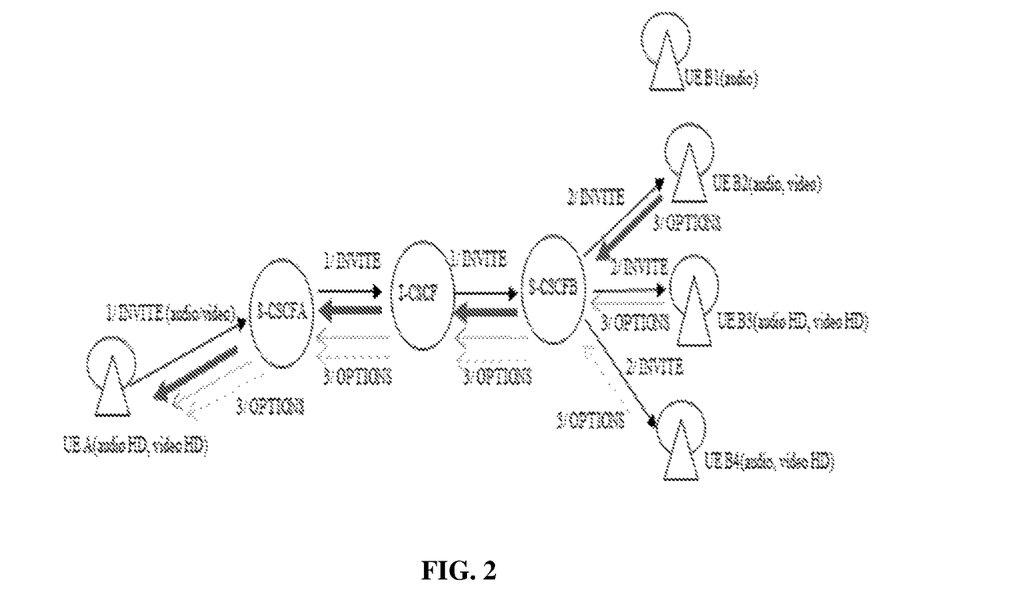
FIG. 2 is a diagram of an implementation of the invention in which a user A of an IMS network seeks to place an audio and video call to another user B of the same IMS network.

As explained above with reference to FIG. 1, the request (specifically an OPTIONS request) sent by the terminal of the first user A is transmitted to the S-CSCF server in charge of the first user A (referenced S-CSCFA in FIG. 2), then to the I-CSCF server in order to be routed to the S-CSCF server in charge of the second user B (referenced S-CSCFB in FIG. 2). The server S-CSCFB then transmits the request (using a forking mechanism) to all of the terminals of the second user B that are connected to the network (specifically B1 to B4).

During a step E2, because of the presence of the "reversecap" indicator in the request sent by the first user A, each respective terminal of the second user B (i.e. B1 to B4) responds to the OPTIONS request sent by the first user by sending in turn to the first user A an OPTIONS request indicating the technical capabilities and including a respective identifier (e.g. the conventional "+sip.instance" label) of the respective terminal.

During a step E3, the terminal of the first user A analyzes the information about technical capabilities contained in the OPTIONS requests, and selects one of them on the basis of that information and optionally of predetermined criteria. Preferably, the terminal of the first user A selects the terminal of the second user B that is most suitable for rendering a service in compliance with predetermined criteria; thus, in the present example, the terminal of the first user A might select the terminal B3 since that terminal (and only that terminal) is compatible with an HD audio and HD video session, assuming that these characteristics are desirable for the first user A compared with an audio or video session of standard or low definition.

During a step E4, the terminal of the first user A sends an INVITE request to the selected terminal (in the present example, to the terminal B3), by using the "+sip.instance" label in the INVITE request in conventional manner for specifying the selected terminal.

Finally, during a step E5, the terminal of the first user A and the terminal B3 engage in an HD audio-video session.

In a second implementation, the following steps are performed:

During a step E'1, the terminal of the first user A sends an INVITE type SIP request to the second user B. This request has a header containing the "reversecap" indicator of the invention.

This request also mentions a service (in the present example an audio and video session) that the user A seeks to obtain during the session that is being set up. To do this, and as defined in IETF documents RFC 3840 and RFC 3841, the terminal of the first user A inserts the featuretag "audio" and the featuretag "video" designating the desired services, e.g. in the "Contact" and "Accept-contact" headers of the request. Where appropriate the featuretag "mmtel" designating a telephone service, the featuretag "sip-im" designating an instant messaging service, etc. may be inserted in like manner.

During a step E'2, the INVITE request sent by the terminal of the first user A is transmitted to the server S-CSCFA and then to the I-CSCF server, and finally to the server S-CSCFB. However, in compliance with the specifications of IETF document RFC 3841, the server S-CSCFB forwards the request only to the terminals of the second user B that are technically suitable for an audio and video session; thus, the terminals B2, B3, and B4 receive the request, but the terminal B1 does not receive it since this terminal is technically suitable for an audio session, but not for a video session.

During a step E'3, because of the presence of the "reversecap" indicator in the request sent by the first user A, each of the terminals of the second user B that receives the INVITE request sent by the first user A (specifically the terminals B2, B3, and B4) responds to the first user A by means of an OPTIONS type request indicating its own technical capabilities.

The step E'4 is analogous to the step E3 described above with reference to the first implementation.

During a step E'5, the terminal of the first user A responds:
   favorably (a SIP 200 OK response) to the OPTIONS request sent by the selected terminal (B3 in this present example), which will continue to present the call (e.g. by ringing); and unfavorably (e.g. by means of an error code specific to the present invention) to the OPTIONS requests sent by the other terminals of the second user B (B2 and B4 in the present example), which then respond to the INVITE request received during step E'2 by specifying they are terminating the current call (e.g. by sending a SIP 487 code).

During the stage of selecting one of the terminals of the second user B, provision may be made for all of the terminals of the second user B that have received the INVITE request during step E'2 to ring, or on the contrary provision may be made for none of them to ring (e.g. as a result of detecting the presence of the "reversecap" indicator in the "Require" header), so that only the terminal that is selected starts ringing (after receiving the 200 OK response sent by the first user A).

Finally, during a step E'6, the terminal of the first user A and the terminal B3 enter into an HD audio-video session.

In a third implementation, the following steps are performed.

During a step E"1, the terminal of the first user A sends an INVITE type SIP request to the second user B. This request mentions a service (in the present example an audio and video session) that the user A seeks to obtain during the session that is being set up, e.g. by inserting the "audio" featuretag and the "video" featuretag in the "Contact" and "Accept-contact" headers of its request.

However, unlike the first and second implementations, this first request sent by the first user A does not contain the indicator of the invention.

Step E"2 is analogous to step E'2 described with reference to the second implementation.

During a step E"3, the first user A receives "provisional" type responses (SIP codes 100 to 199) from each of the terminals of the second user B that has received the INVITE request sent by the first user A (specifically the terminals B2, B3, and B4).

During a step E"4, the first user A sends a second SIP request, e.g. an UPDATE type request having a header containing the "reversecap" indicator of the invention, or a request of a type specific to the present invention (referred to herein as "REVOPTIONS") to each of the terminals that has responded (specifically the terminals B2, B3, and B4).

During a step E"5, each of the terminals of the second user B that has received the second request sent by the first user A (specifically the terminals B2, B3, and B4) thus responds to the first user A with an OPTIONS type request specifying its own technical capabilities.

Thereafter, steps E"6 to E"8 are performed, which are analogous respectively to the steps E'4 to E'6 described above with reference to the second implementation.

In the example described above in application of three implementations, it is assumed not only that the second user B has several terminals suitable for rendering the service desired by the first terminal A, but also that one of the terminals (namely B3) is suitable for rendering a high quality service (HD audio and HD video).

However, under other circumstances, it might naturally happen that none of the terminals of the second user B is suitable for rendering the service desired by the first user A. Under such circumstances, provision may be made for the terminal of the first user A to select the terminal of the user B that is the most suitable for providing the first user A with a service of reduced quality, in application of predetermined criteria. The terminal of the first user A is suitable for making this selection as a result of receiving the capabilities of the terminals B, as described above.

In general, the present invention may be performed within nodes of an IP network, e.g. client devices, by using software and/or hardware components.

The software components may be incorporated in a conventional computer program for managing a network node. That is why, as mentioned above, the present invention also provides a computer system. The computer system comprises in conventional manner a central processor unit using signals to control a memory and an output unit and an input unit. Furthermore, the computer system may be used to execute a computer program including instructions for performing any of the selection methods of the invention.

Specifically, the invention also provides a computer program downloadable from a communications network and including instructions for executing steps of a selection method of the invention when executed on a computer. The computer program may be stored on a computer-readable medium and may be executable by a microprocessor.

The program may use any programming language, and be in the form of source code, object code, or code intermediate between source code and object code, such as in a partially compiled form, or in any other desirable form.

The invention also provides a data medium that may be non-removable, or partially or totally removable, that is computer-readable and that includes instructions of a computer program as mentioned above.

The data medium may be any entity or device capable of storing the program. For example, the medium may comprise storage means such as a read-only memory (ROM), e.g. a compact disk (CD) ROM or a microelectronic circuit ROM, or magnetic recording means, such as a hard disk, or indeed a universal serial bus (USB) flash drive.

Furthermore, the data medium may be a transmissible medium such as an electrical or optical signal, which may be conveyed by electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the selection methods of the invention.

The invention claimed is:

1. A selection method enabling a first user of an IP network to select one client device from a plurality of client devices of a second user connected to the IP network, the IP network using a session control protocol using signaling messages comprising request-type messages and response-type messages used to respond to request-type messages, the method comprising:

sending, by a client device of the first user to the second user, a preliminary request-type message mentioning a service that the first user seeks to obtain during a session that is being set up and an initial request-type message, the preliminary request-type message being sent prior to the initial request-type message, the second user having a plurality of client devices connected to the IP network, the plurality of client devices of the second user sharing a common IP multimedia public identity of the second user, the initial request-type message having a header containing a dedicated indicator and being transmitted to all of the client devices of the second user that are connected to the IP network;

for each of the plurality of client devices of the second user that has received the initial request-type message:
detecting, by the client device of the second user that has received the initial request-type message, the presence of the dedicated indicator in the initial request-type message; and responding to the initial request-type message by the client device of the second user by sending a subsequent request-type message in place of a response-type message, the sending of the subsequent request-type message as a response to the initial request-type message being triggered by the detection of the presence of the dedicated indicator in the initial request-type message by the by the client device, the subsequent request-type message indicating technical capabilities of the by the client device of the second user and requesting the client device of the first user to supply technical capabilities of that client device of the first user to enable the client device of the first user to select a client device of the second user from among the plurality of client devices of the second user;

selecting, by the client device of the first user after receiving the subsequent request-type messages sent by client devices of the second user, one of those client devices of the second user at least on the basis of technical capability information contained in those subsequent request-type messages;

sending, by the client device of the first user, to the selected client device a favorable response to the subsequent request-type message sent by the selected client device; and in addition to sending a favorable response to the subsequent request-type message sent by the selected client device, sending, by the client device of the first user, an unfavorable response to the subsequent request-type messages sent by the client devices of the second user that are not selected.

2. The selection method of claim 1, further comprising entering into a session by the client device of the first user and the selected client device.

3. The selection method of claim 1 wherein:

the subsequent request-type message sent by each respective client device of the second user during process b) includes a respective identifier of that client device; and the client device of the first user inserts the identifier of the selected client device in the response sent to the selected client device.

4. The selection method of claim 1, wherein the initial request-type message sent by the client device of the first user mentions a service that the first user seeks to obtain during the session that is being set up.

5. The selection method of claim 1, wherein, if none of the client devices of the second user which have sent a subsequent request-type message indicating its technical capabilities is technically suitable for providing a service desired by the first user, then, during the selection by the client device of the first user of one of the client devices of the second user, the client device of the first user selects from among the client devices of the second user the client device that is the most suitable for supplying a service of reduced quality to the first user.

6. A client device of a first user of an IP network, the IP network using a session control protocol using signaling messages comprising request-type messages and response-type messages used to respond to request-type messages, the client device being configured to take account of a subsequent request-type message received from at least one client device of a plurality of client devices of a second user of the IP network, the plurality of client devices of the second user sharing a common IP multimedia public identity of the second user, the subsequent request-type message indicating technical capabilities of the at least one client device of the plurality of client devices of the second user and requesting the client device of the first user to supply technical capabilities of the client device of the first user;

wherein the client device of the first user is configured to:

send to the second user a preliminary request-type message mentioning a service that the first user seeks to obtain during a session that is being set up; and after sending the preliminary request-type message, send an initial request-type message to the second user, the initial request-type message being transmitted to all of the client devices of the second user that are connected to the IP network, the initial request-type message including a header containing a dedicated indicator, the dedicated indicator configured to trigger, upon detection of the presence of the dedicated indicator in the initial request-type message, any client device of the IP network that has received the first request-type message to send a subsequent request-type message as a response to the initial request-type message instead of a response-type message;

select, after receiving the subsequent request-type messages sent by client devices of the second user, one of those client devices of the second user at least on the basis of technical capability information contained in those subsequent request-type messages;

send to the selected client device a favorable response to the subsequent request-type message sent by the selected client device; and in addition to sending a favorable response to the subsequent request-type message sent by the selected client device, send an unfavorable response to the subsequent request-type messages sent by the client devices of the second user that are not selected.

7. A client device of a second user of an IP network, the IP network using a session control protocol using signaling messages comprising request-type messages and response-type messages used to respond to request-type messages, wherein the client device is configured to:

receive a preliminary request-type message sent by a client device of a first user mentioning a service that the first user seeks to obtain during a session that is being set up;

receive, after reception of the preliminary request-type message, an initial request-type message sent by the client device of the first user of the IP network, the initial request-type message including a header containing a dedicated indicator, the initial request-type message having been transmitted to all of the client devices of the second user that are connected to the IP network;

detect the presence of the dedicated indicator in the initial request-type message;

send a subsequent request-type message in response to the initial request-type message in place of a response-type message, the sending of the subsequent request-type message as a response to the initial request-type message being triggered by the detection of the presence of the dedicated indicator in the initial request-type message, the subsequent request-type message indicating its own technical capabilities and requesting the client device of the first user to supply technical capabilities of the client device of the first user to enable the client device of the first user to select a client device of the second user from among a plurality of client devices of the second user, the plurality of client devices of the second user sharing a common IP multimedia public identity of the second user; and if the client device of the first user selects the client device of the second user on the basis of technical capability information contained in the subsequent request-type message, receive from the client device of the first user a favorable response to the subsequent request-type message sent by the client device of the second user; or if the client device of the first user does not select the client device of the second user, receive from the client device of the first user an unfavorable response to the subsequent request-type message sent by the client device of the second user.

8. A non-transitory computer readable medium having stored thereon, instructions, which when executed by a processor, cause the processor to perform a selection method enabling a first user of an IP network to select one client device from a plurality of client devices of a second user connected to the IP network, the IP network using a session control protocol using signaling messages comprising request-type messages and response-type messages used to respond to request-type messages, wherein the method comprises:

sending, by a client device of the first user to the second user, a preliminary request-type message mentioning a service that the first user seeks to obtain during a session that is being set up and an initial request-type message, the preliminary request-type message being sent prior to the initial request-type message, the second user having a plurality of client devices connected to the IP network, the plurality of client devices of the second user sharing a common IP multimedia public identity of the second user, the initial request-type message having a header containing a dedicated indicator and being transmitted to all of the client devices of the second user that are connected to the IP network;

for each of the plurality of client devices of the second user that has received the initial request-type message:

detecting, by the client device of the second user that has received the initial request-type message, the presence of the dedicated indicator in the initial request-type message; and responding to the initial request-type message by the client device of the second user by sending a subsequent request-type message in place of a response-type message, the sending of the subsequent request-type message as a response to the initial request-type message being triggered by the detection of the presence of the dedicated indicator in the initial request-type message by the by the client device, the subsequent request-type message indicating technical capabilities of the by the client device of the second user and requesting the client device of the first user to supply technical capabilities of that client device of the first user to enable the client device of the first user to select a client device of the second user from among the plurality of client devices of the second user;

selecting, by the client device of the first user after receiving the subsequent request-type messages sent by client devices of the second user, one of those client devices of the second user at least on the basis of technical capability information contained in those subsequent request-type messages;

sending, by the client device of the first user, to the selected client device a favorable response to the subsequent request-type message sent by the selected client device; and in addition to sending a favorable response to the subsequent request-type message sent by the selected client device, sending, by the client device of the first user, an unfavorable response to the subsequent request-type messages sent by the client devices of the second user that are not selected.

9. A computer comprising a processor and a memory, the memory having stored thereon instructions which when executed by the processor, cause the computer to perform a selection method enabling a first user of an IP network to select one client device from a plurality of client devices of a second user connected to the IP network, the IP network using a session control protocol using signaling messages comprising request-type messages and response-type messages used to respond to request-type messages, wherein the method comprises:

sending, by a client device of the first user to the second user, a preliminary request-type message mentioning a service that the first user seeks to obtain during a session that is being set up and an initial request-type message, the preliminary request-type message being sent prior to the initial request-type message, the second user having a plurality of client devices connected to the IP network, the plurality of client devices of the second user sharing a common IP multimedia public identity of the second user, the initial request-type message or having a header containing a dedicated indicator and being transmitted to all of the client devices of the second user that are connected to the IP network;

detecting, by at least one of the plurality of client devices of the second user that has received the initial request-type message, the presence of the dedicated indicator in the initial request-type message; and for each of the plurality of client devices of the second user that has received the initial request-type message:

detecting, by the client device of the second user that has received the initial request-type message, the presence of the dedicated indicator in the initial request-type message; and responding to the initial request-type message by the client device of the second user by sending a subsequent request-type message in place of a response-type message, the sending of the subsequent request-type message as a response to the initial request-type message being triggered by the detection of the presence of the dedicated indicator in the initial request-type message by the by the client device, the subsequent request-type message indicating technical capabilities of the by the client device of the second user and requesting the client device of the first user to supply technical capabilities of that client device of the first user to enable the client device of the first user to select a client device of the second user from among the plurality of client devices of the second user;

selecting, by the client device of the first user after receiving the subsequent request-type messages sent by client devices of the second user, one of those client devices of the second user at least on the basis of technical capability information contained in those subsequent request-type messages;

sending, by the client device of the first user, to the selected client device a favorable response to the subsequent request-type message sent by the selected client device; and in addition to sending a favorable response to the subsequent request-type message sent by the selected client device, sending, by the client device of the first user, an unfavorable response to the subsequent request-type messages sent by the client devices of the second user that are not selected.

10. The method of claim 1, wherein the subsequent request-type message is the first message sent by the at least one of the plurality of client devices of the second user to the client device of the first user after receipt of the initial request-type message from the client device of the first user.

* * * * *